United States Patent
Stogner et al.

(10) Patent No.: US 6,842,432 B2
(45) Date of Patent: Jan. 11, 2005

(54) METHOD FOR ALLOCATING CHANNEL RESOURCES IN A DISTRIBUTED CONTROL CHANNEL SYSTEM

(75) Inventors: Darrell James Stogner, Plantation, FL (US); Robert D. Logalbo, Hoffman Estates, IL (US); Scott M. Alazraki, Davie, FL (US); Apoorv Chaudhri, Sunrise, FL (US); Alan P. Conrad, St. Charles, IL (US); Stan Jelavic, Davie, FL (US)

(73) Assignee: Motorola, Inc., Schaumburg, IL (US)

( * ) Notice: Subject to any disclaimer, the term of this patent is extended or adjusted under 35 U.S.C. 154(b) by 226 days.

(21) Appl. No.: 10/315,902

(22) Filed: Dec. 10, 2002

(65) Prior Publication Data

US 2004/0109421 A1 Jun. 10, 2004

(51) Int. Cl.[7] .............................................. H04Q 11/00
(52) U.S. Cl. ...................................... 370/265; 370/349
(58) Field of Search ................................. 370/252, 321, 370/334, 347, 348, 349, 397, 461, 468, 473, 474, 265, 270, 276, 326; 375/240.15, 240.25, 240.27; 714/822; 348/390.1, 406

(56) References Cited

U.S. PATENT DOCUMENTS

| | | | | |
|---|---|---|---|---|
| 4,763,319 A | * | 8/1988 | Rozenblit | 370/397 |
| 5,142,533 A | * | 8/1992 | Crisler et al. | 370/349 |
| 5,365,272 A | * | 11/1994 | Siracusa | 370/473 |
| 5,420,864 A | * | 5/1995 | Dahlin et al. | 370/347 |
| 5,434,847 A | * | 7/1995 | Kou | 370/349 |
| 5,517,250 A | * | 5/1996 | Hoogenboom et al. | 375/240.27 |
| 5,584,048 A | | 12/1996 | Wieczorek | |
| 6,094,429 A | | 7/2000 | Blanchette et al. | |

* cited by examiner

*Primary Examiner*—Duc Ho
*Assistant Examiner*—Phuongchau Ba Nguyen
(74) *Attorney, Agent, or Firm*—Terri S. Hughes

(57) ABSTRACT

An outbound message (200) identifies a slot type associated with each timeslot in a scheduling period. In one embodiment, the outbound message further identifies at least an address of a first subscriber group assigned to transmit in a first timeslot (206) if the slot type of the first timeslot is of a first type and an address of a second subscriber group assigned to transmit in a second timeslot (208) if the slot type of the second timeslot is of a second type, wherein the first type and the second type could be the same or different. In a second embodiment, the outbound message further identifies at least a group address associated with a plurality of subscriber units assigned to transmit in a first timeslot if the slot type of the first timeslot is of a first type. In yet a third embodiment, the outbound message further identifies an address of a first subscriber group assigned to transmit in a first timeslot if the slot type of the first timeslot is of the first type, and a second timeslot (210) of a second type.

13 Claims, 2 Drawing Sheets

METHOD FOR ALLOCATING CHANNEL RESOURCES IN A DISTRIBUTED CONTROL CHANNEL SYSTEM

FIELD OF THE INVENTION

This invention relates generally to method for allocating channel resources in a distributed control channel system.

BACKGROUND OF THE INVENTION

In a time division multiple access system, inbound 102 slot assignments can be requested from a subscriber unit to an infrastructure through a Slot Reservation Request message on either a Random Access slot or a Reserved Access slot. The infrastructure responds on outbound 100 timeslots with a Slot Reservation Request Feedback message 104. It should be noted that the outbound channel is defined as conveying the information flow from the infrastructure to the subscriber units; likewise, the inbound channel is defined as conveying the information flow from the subscriber units to the infrastructure. As shown in FIG. 1 the Feedback message 104 contains the subscriber address 106, the Forward Slot Assignment (SA) field 108 that gives an indication of upcoming slots assigned to the subscriber, and the Slot Type Field (SLT) 110 that indicates if the slot is for random or reserved access. The subscriber transmits blocks on the assigned timeslots as shown in FIG. 1.

The problem with the access scheme is that the Slot Assignment field is limited to seven SA bits. Consequently the assignment can be made only for the next seven slots maximum. After this time a new assignment has to be made. Considering the number of subscribers at the radio sites, and the number of assignment requests being made, the Slot Reservation Request Feedback messages have to be sent very frequently, leaving less bandwidth for data transmissions.

As an example, FIG. 1 shows the outbound timeslot 1 (Slot 1) containing a subscriber assignment identifier that specifies the slot assignment of inbound timeslot 1 (S1).

For a full duplex subscriber unit, all inbound slot assignments made on the outbound channel can be decoded even when transmitting on an inbound timeslot. A half duplex subscriber unit, however, cannot receive the outbound slot assignments made on outbound timeslots that are adjacent to the one it is transmitting inbound as shown in FIG. 1; the half duplex subscriber unit cannot fully utilize the inbound channel. In FIG. 1, a half duplex subscriber unit transmitting on inbound timeslot 7 (Slot 7) cannot receive the slot assignments in the outbound timeslots 8 and 9 (Slot 8 and Slot 9). Slot assignments, containing the slot type field, to the half duplex subscriber unit transmitting in timeslot 7, made in the outbound timeslots 8 and 9 will be missed, resulting in their corresponding inbound timeslots going unused; those outbound timeslots cannot contain data, including slot assignments for the transmitting half duplex subscriber unit. A problem with this method is that a half duplex subscriber unit can only use one in every three inbound timeslots, thus cutting the available throughput by two thirds.

Thus, there exists a need for a method that specifies the resource allocation and access for up to the next N timeslots.

BRIEF DESCRIPTION OF THE FIGURES

A preferred embodiment of the invention is now described, by way of example only, with reference to the accompanying figures in which.

DETAILED DESCRIPTION OF THE PREFERRED EMBODIMENT

Figure 1:
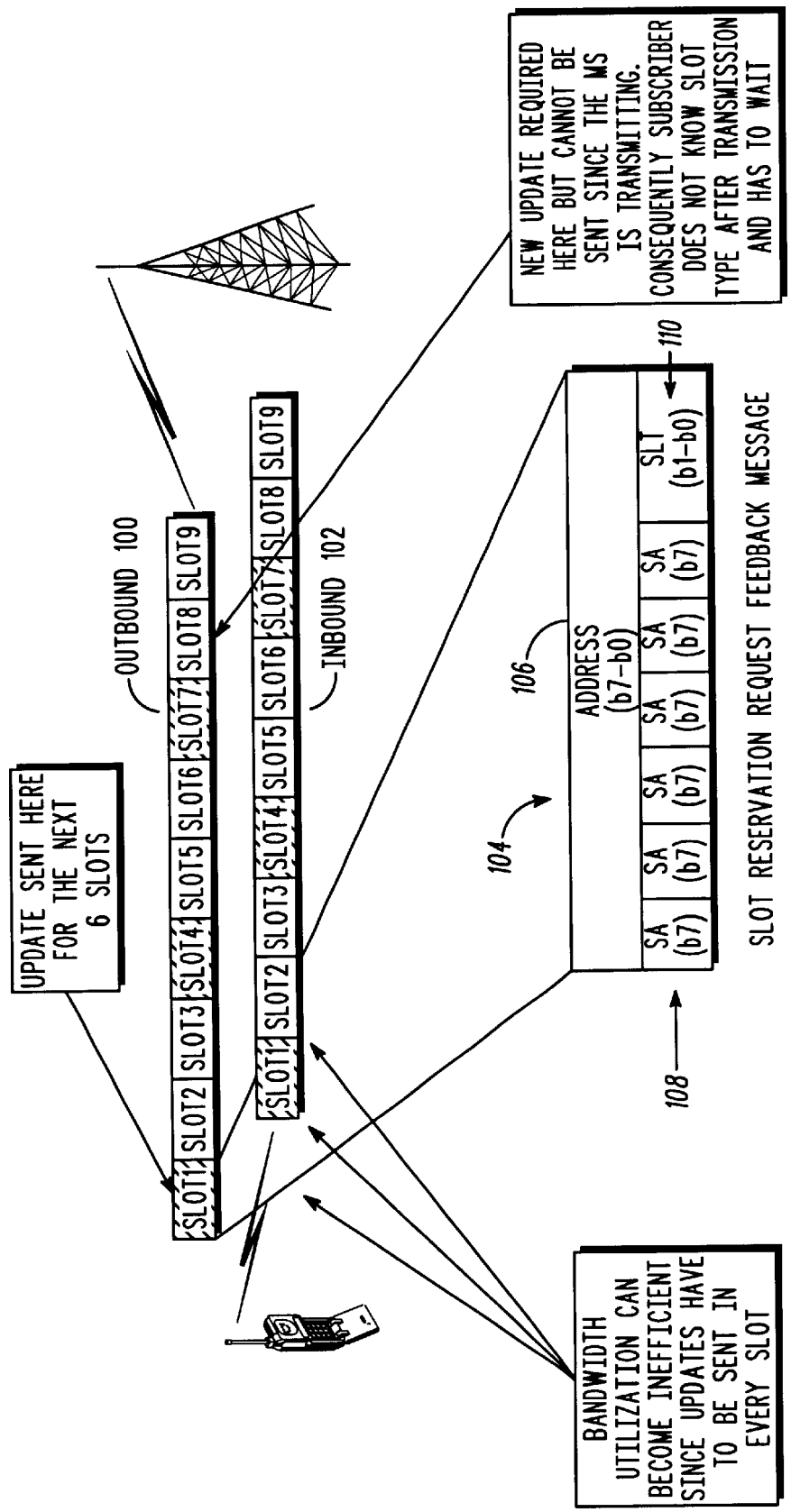
FIG. 1 (prior art) illustrates inbound resource allocation to subscriber population.

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

The present invention proposes a method that specifies the resource allocation and access method for up to the next N timeslots. One advantage of the present invention is that the method disclosed is able to grant contiguous transmission capabilities to a plurality of subscriber units operating in half-duplex mode. Thus, the present invention eliminates the need for the subscriber units to monitor every outbound timeslot to acquire the control channel or the timeslot reserved for it. The half-duplex subscriber unit can learn of the upcoming inbound timeslot assignments and then transmit on their assigned timeslots without having to decode the associated outbound slot header. Preferably, the infrastructure is any device or equipment that provides at least the reference system clock (e.g., base station synchronized to a global positioning system receiver, or the like). Each channel comprises a stream of timeslots.

In the present invention, the outbound channel carries a Dynamic Resource Allocation and Access Protocol ("DRAAP") message on some quasi-periodic basis. The DRAAP message allows the infrastructure to signal allocation and access for several inbound timeslots in advance to the various subscribers. The DRAAP message contains information as to what type of access is available for the inbound timeslots to follow, along with the assigned subscriber addresses, if applicable.

The DRAAP message may contain any of the following fields: a DRAAP period field a slot type field, and/or a slot assignment address field. The DRAAP period determines the number of timeslots scheduled by the DRAAP message that defines the scheduling period. The number of timeslots can be fixed or variable. Thus, the DRAAP period is used to specify the number of timeslot assignments, and thus the period of the DRAAP interval.

The slot type field indicates the inbound slot type; there may be multiple inbound slot types, all of which may be signaled in the DRAAP message. The slot type field gives the subscriber units an indication as to how a particular timeslot is to be used. It is important to note that, in the preferred embodiment, there is a slot type field for each timeslot in the scheduling period. Alternatively, an additional field can be used to specify multiple slots of the same type within the scheduling period. The inbound slot type field can take on a number of values for each timeslot: reserved access slot, random access slot, linearization opportunity, quiet opportunity, etc. In the preferred embodiment, an amount of time dedicated to the transmission of one subscriber unit is referred to as a "reserved" access slot; an amount of time dedicated to the transmission of any number of subscriber units (e.g., all or a group of subscriber units) requiring access to the inbound channel is referred to as a "random access" slot; an amount of time dedicated to calibration of transmitter hardware for a plurality of subscriber units is referred to as a "linearization" opportunity; and an amount of time dedicated to non-transmission on the inbound channel is referred to as a "quiet" opportunity, etc.

The slot assignment address field indicates which subscriber unit may transmit on a given inbound timeslot; thus, any subscriber unit whose address does not match the address contained in the slot assignment address field may not transmit on the given inbound timeslot. When an address of a particular subscriber unit is not identified in the slot assignment address field, any number of subscriber units, or possibly none at all, may transmit on the given inbound timeslot, depending on the information in the slot type field. In the preferred embodiment, if an address of a particular subscriber unit is not needed for a given timeslot (e.g., random access slot), the slot assignment address field is omitted entirely for that timeslot, thus preserving bandwidth. In view of the present invention, it will be obvious to those skilled in the art that there are other ways within the scope of the present invention to preserve bandwidth, such as, assigning consecutive timeslots to a subscriber unit using a single slot assignment address field.

Figure 2:
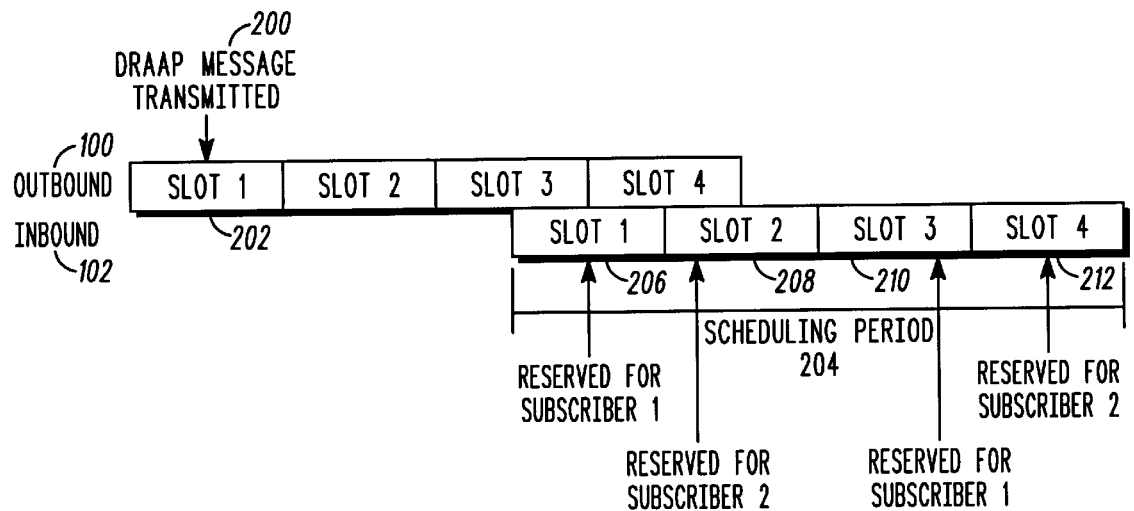
FIG. 2 illustrates an example of inbound slot assignments in accordance with the present invention.

Let us now turn to an example of the present invention. FIG. 2 illustrates an example of an inbound timeslot assignment in accordance with the present invention. As illustrated, the DRAAP message 200 is preferably transmitted in the first outbound timeslot 202. It should be noted that the DRAPP message 200 may be transmitted, however, in any outbound timeslot or may span over contiguous timeslots. In this example, the scheduling period 204 is four timeslots. As a result, the DRAAP message conveys the utilization of each timeslot as follows: the first inbound timeslot 206 is a reserved access slot for subscriber unit 1; the second inbound timeslot 208 is a reserved access slot for subscriber unit 2; the third inbound timeslot 210 is a reserved access slot for subscriber unit 1; and the fourth inbound timeslot 212 is a reserved access slot for subscriber unit 2.

Figure 3:
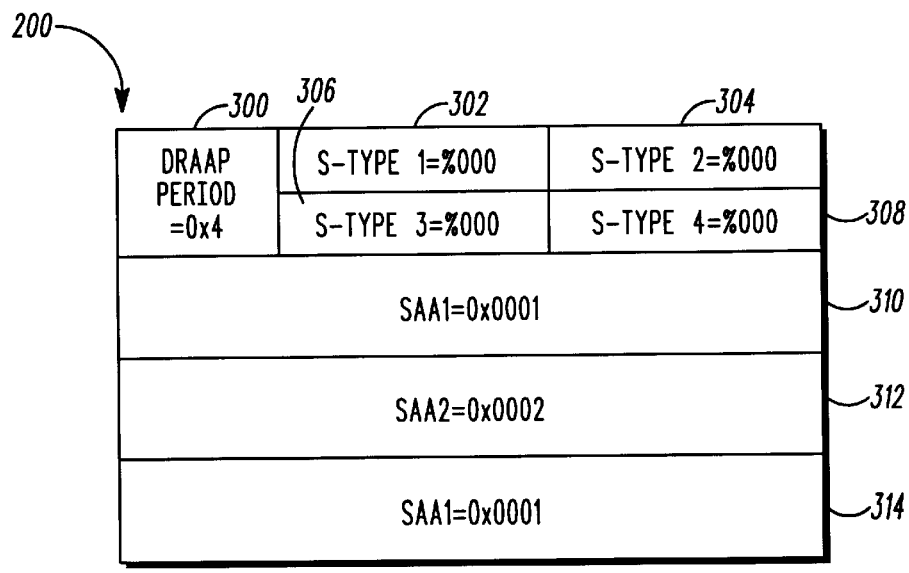
FIG. 3 illustrates the associated DRAAP message for the inbound slot assignments in FIG. 2 in accordance with the present invention.

Referring now to FIG. 3, an example of the DRAAP message that corresponds to the inbound timeslot assignments of FIG. 2 is illustrated. As described above, the DRAAP message 200 in this example comprises the DRAAP period 300, a plurality of slot type fields 302, 304, 306, and 308, and a plurality of slot assignment address fields 310, 312 and 314. For the present example, the reserved access slot has a value of % 000. It is important to note that these slot types may be associated with different values and/or other slot types may be defined. Each value preceded by a percent sign is a binary value (0 or 1); each value preceded by 0x is a hexadecimal value (0 through F).

In this example, the value of the DRAAP period 300 is equal to four, which corresponds to the scheduling period 204, however, the DRAAP period 300 does not necessarily equal the scheduling period 204. For example, the DRAAP period could be 2 and the scheduling period could then be 4*(1+2)=12 slots; thus, in this case, the DRAAP period and the scheduling period are not equal but preferably they are related. As noted above in FIG. 2, since the first inbound timeslot 206, the third inbound timeslot 210 are reserved access timeslots for subscriber unit 1, and the second inbound timeslot 208 and the fourth inbound timeslot 212 are reserved access timeslots for subscriber 2, the value of the slot type fields 302, 304, 306, 308 for these inbound timeslots are equal to % 000.

Also illustrated in FIG. 3 are the slot assignment address fields 310, 312, 314. In this example, only the first inbound timeslot 206, second inbound timeslot 208 and third inbound timeslot 210, have corresponding slot assignment address fields 310, 312, and 314, respectively, because they are the only reserved access timeslots in this example. In the preferred embodiment, as illustrated, the slot assignment address field corresponding to the fourth inbound timeslot is omitted because it is not a "reserved" access slot. In an alternative embodiment, however, the slot assignment address fields for the fourth inbound timeslots may be present without containing a specific address.

Thus, by utilizing the DRAAP message in accordance with the present invention, a plurality of inbound slot assignments have been reserved in a single message. Using prior art, subscriber 1 operating in half duplex mode would be unable to receive the slot reservation for the third timeslot as it would be transmitting. Since the scheduling occurs at the beginning of the scheduling period, the half duplex subscriber has access to all slot assignments within that scheduling period. This reduces the restriction on consecutive transmissions by a half duplex subscriber to only those slots adjacent to the DRAAP for the following scheduling period.

It should be noted that in the preferred embodiment, the present invention utilizes a storage medium having stored thereon a set of instructions which, when loaded into a microprocessor, causes the microprocessor to perform the details of the present invention as described above. It should be obvious to those skilled in the art, however, that the present invention may be implemented in hardware and/or software.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

Moreover, the term "a" or "an", as used herein, are defined as one or more than one. The term "plurality", as used herein, defined as two or more than two. The term "another", as used herein, is defined as at least a second or more. The terms "including" and/or "having", as used herein, are defined as comprising (i.e., open language).

We claim:

1. A method comprising the steps of:

identifying in an Dynamic Resource Allocation and Access Protocol (DRAAP) outbound message a slot type associated with each timeslot in a scheduling period; and identifying in the Dynamic Resource Allocation and Access Protocol (DRAAP) outbound message an address of a first subscriber group assigned to transmit in a first timeslot if the slot type of the first timeslot is of a first type and an address of a second subscriber group assigned to transmit in a second timeslot if the slot type wherein identifying in the DRAAP outbound message a group address associated with a plurality of subscriber units assigned to transmit in a third timeslot if the slot type of the third time slot is of a third type of the second timeslot is of the second type.

2. The method of claim 1 wherein the first type and second type are of the same type.

3. The method of claim 1 wherein the first type and the second type are the same.

4. The method of claim 1 wherein the first subscriber group and the second subscriber group each comprise at least one subscriber unit.

5. The method of claim 1 wherein at least one of the first type and the second type is a reserved access slot type.

6. The method of claim 1 wherein the third type is a random access slot type, a linearization opportunity slot type, and a quiet opportunity slot type.

7. The method of claim 1 wherein the scheduling period is a fixed number of timeslots.

8. The method of claim 1 wherein the scheduling period is a variable number of timeslots.

9. The method of claim 8 wherein the variable number of timeslots is self-scheduling.

10. A method comprising the steps of:

identifying in an Dynamic Resource Allocation and Access Protocol (DRAAP) outbound message a slot type associated with each timeslot in a scheduling period; and identifying in the Dynamic Resource Allocation and Access Protocol (DRAAP) outbound message a group address associated with a plurality of subscriber units assigned to transmit in a first timeslot if the slot type of the first timeslot is of a first type wherein the first type is one of a random access slot type, and a linearization opportunity slot type.

11. A method comprising the steps of:

identifying in an Dynamic Resource Allocation and Access Protocol (DRAAP) outbound message a slot type associated with each timeslot in a scheduling period;

identifying in the Dynamic Resource Allocation and Access Protocol (DRAAP) outbound message an address of a subscriber group assigned to transmit in a first timeslot if the slot type of the first timeslot is of the first type; and identifying in the Dynamic Resource Allocation and Access Protocol (DRAAP) outbound message that a second timeslot is of a second type wherein the second type is one of a random access slot type, a linearization opportunity slot type, and a quiet opportunity slot type.

12. The method of claim 11 wherein the subscriber group comprises at least one subscriber unit.

13. The method of claim 11 wherein the first type is a reserved access slot type.

* * * * *